Aug. 6, 1935.  E. C. STEWART  2,010,334
METHOD OF AND APPARATUS FOR FEEDING MOLTEN GLASS
Filed April 18, 1933
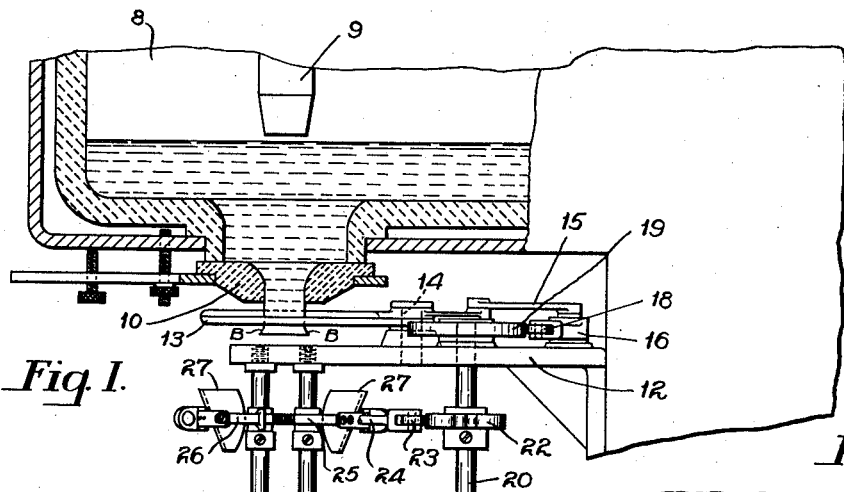
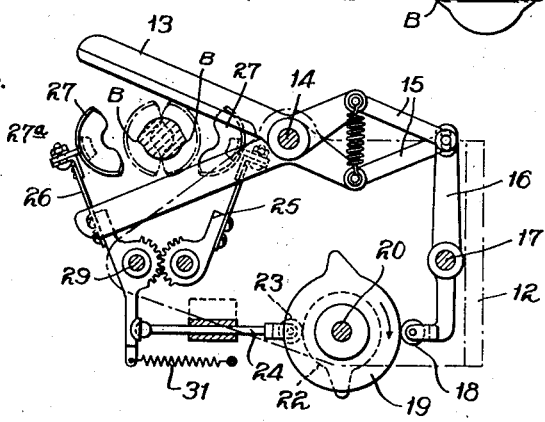
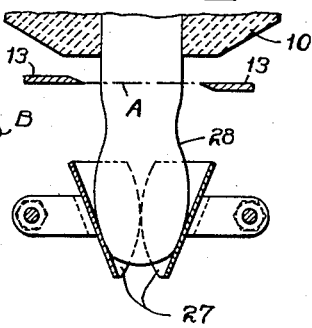
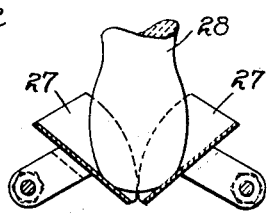
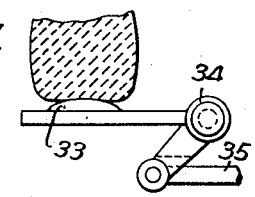
INVENTOR
Edward C. Stewart,
By Archworth Martin,
Attorney.

Patented Aug. 6, 1935

2,010,334

UNITED STATES PATENT OFFICE 2,010,334

METHOD OF AND APPARATUS FOR FEEDING MOLTEN GLASS

Edward C. Stewart, Washington, Pa., assignor to Tygart Valley Glass Company, Washington, Pa., a corporation of West Virginia Application April 18, 1933, Serial No. 666,687

4 Claims. (Cl. 49—55)

My invention relates to a method of and apparatus for feeding molten glass, and more particularly to the forming of mold charges.

It has been common practice to form mold charges by causing a stream of molten glass to flow from the discharge orifice of a furnace boot or forehearth, the mold charges being cut from the glass as it emerges from the discharge orifice of the boot. In some systems, the flow of glass from the orifice is periodically accelerated and retarded by various devices, such as reciprocating plungers and air pressure and suction.

In all instances, the problem of shear marks is met with, such shear marks causing irregularly-shaped chilled protrusions at the ends of the mold charges, and finally appearing as imperfections in the finished ware.

The retarding forces referred to which may be applied to the glass above the orifice by lifting of the plunger or the application of vacuum are sometimes employed not only to slightly delay the flow during shearing, but to form what is termed a suspended mold charge that may be caused to assume various shapes. If enough suction or vacuum is applied, the lower end of the stream bearing the shear mark will be drawn into the orifice to effect incorporation thereof with the hotter glass.

Attempts have been made to also eliminate shear marks, by retarding the stream flow and applying a heating flame to the lower end of the glass below the orifice. Again, shaping cups have been provided into which the shear charge drops, and in some instances the cups are heated to prevent too great chilling of the glass.

While the dropping of a shear charge into a cup may have some tendency to push the protruding shear mark into the body of the mold charge, there is a tendency toward the folding over or lapping back of the sheared edge or protrusion at the lower end of the mold charge, and there is, of course, some chilling of the charge, so that the shear mark does not become properly incorporated in and softened by the body of glass composing the charge.

The older practices above-referred to not only fail to cause proper assimilation of the shear marks in the mold charges, but required a somewhat slower mode of operation than in the case of my invention.

One object of my invention is to provide a means and a method for cutting mold charges from a freely flowing stream of glass, without the necessity of periodically retarding such flow.

Another object of my invention is to provide a means and a method for forming properly-shaped mold charges without the necessity of using shaping cups or the employment of the suspended-charge method of feeding.

Still another object of my invention is to provide an improved means for eliminating shear marks at both the lower and the upper ends of a mold charge.

Some of the ways in which my invention may be practised are shown in the accompanying drawing wherein Figure 1 is a sectional view through a portion of a furnace boot with my apparatus in place; Fig. 2 is a sectional plan view of the apparatus of Fig. 1; Fig. 3 is an inverted plan view, showing the shape imparted to the lower end of a molten glass stream by shears of the scissors type; Fig. 4 is an enlarged view, showing a mold charge at the time of shearing, and the manner in which shear marks at the lower end of the charge are eliminated; Fig. 5 is a view similar to Fig. 4, but showing the presser members at a different position of adjustment; Fig. 6 shows means for eliminating shear marks formed by shears of the V or fishtail type, and Fig. 7 shows said means in operative position with respect to the mold charge.

Referring first to Figs. 1 to 4, the furnace boot or forehearth is represented by the numeral 8 and a stopper or valve by the numeral 9. A flow ring or orifice bushing 10 is detachably mounted in the bottom of the boot, and can be replaced by other flow rings having orifices of different diameters than that shown in the ring 10.

While the glass is shown as flowing from the boot only under the action of gravity, it will be understood that various features of my invention may be employed also in connection with feeders of the pulsating type, including not only the so-called air feeders, but also feeders of the reciprocating plunger type.

The glass as it issues from the orifice will gradually assume a shape departing from its cylindrical or other uniform cross section; thus, as shown in Fig. 4, the glass above the shear line is of approximately uniform cross section, but as it continues to flow, it will elongate and tend to contract somewhat. In the forming of smaller charges of glass, I may shear the stream while it is still of approximately cylindrical form as shown in Fig. 6. Where the glass is permitted to flow for a longer period of time between shear operations, it will assume the shape shown in Fig. 4. In that event, I may shear either at the contracted portion or at the shear line A, somewhat above the contracted area of the glass. This shearing is preferably effected close to the orifice so as to be in the hotter portions of the glass, with the result that the shear mark on the upper end of a charge will settle and tend to be incorporated in and melted by the glass.

The shear mark at the lower end of a charge will be of a shape determined by the type of shears used. Thus if shears of the straight blade or scissors type be employed, the irregularity resulting from shearing will be of what is sometimes called the "pillow" type, as shown in Fig. 3, while with shears of the fishtail or V type, the shear mark will appear in the form of a pointed stub, as in Fig. 6. In either case, there are irregular protrusions at the lower end or lower corners of the mold charge, which should be eliminated in order to avoid their appearing as imperfections in the finished ware. An important feature of my invention resides in the pushing of these ragged or irregular protrusions into the body of the mold charge before the charge enters a shaping cup or a mold.

In Figs. 1 and 2, I show shears of the scissors type that are mounted upon a bracket plate 12 disposed beneath the boot 8. The shear blades 13 are mounted upon a pivot pin 14, and have connection through toggle links 15 with an operating lever 16. The operating lever is pivoted at 17 to the bracket 12 and carries a roller 18 that is yieldably maintained in contact with a cam disc 19 that is keyed to a shaft 20. As the shaft 20 rotates, the lever 16 is oscillated by the cam 19 to close and open the shear blades 13. The bracket 12 is adjustable vertically in order to position the shear blades at a desired distance below the orifice 10.

A cam disc 22 is also secured to the shaft 20 and through a roller 23 and a push rod 24 operates a pair of arms 25 and 26 which carry presser members 27. The presser members are adjustable on their arms to various angles, by means of attaching bolts 27a, so that they can properly engage the protruding corners B of the mold charge 28, and push said corners into the mass of glass, as shown in Fig. 4. The angularity of the presser members will, of course, be determined by the direction in which the said protrusions extend, in order to prevent folding thereof and to cause them to be pushed directly into the mass of glass.

The arms 25 and 26 are pivotally mounted on studs or pins 29 that are supported by the bracket 12, and have segmental gears incorporated therein, so that oscillation of the arm 26 by a push rod 24 will cause oscillation of the arm 25 also. A spring 31 serves to maintain the cam roller 23 in engagement with the cam disc 22. The arms 25—26 and the cam 22 are adjustable axially of the pins 29 and shaft 20, respectively, so as to effect the desired positioning of the presser members 27.

The cam discs 19 and 22 are adjustable about the axis of the shaft 20, so that the shears and the shaping members will be operated in a desired timed relation. It will be understood that the shears and the presser members can be operated by means other than cams. For example, they may be operated by air cylinders in a manner similar to that shown in my application, Serial No. 630,344, filed August 25, 1932 (Patent No. 1,986,650).

As shown in the drawing, the presser members 27 may suitably be operated at approximately the instant that the shear blades close, but, of course, can be caused to engage the glass either before or after operation of the shears. As stated above, the pressers push the shear protrusions into the mass of glass, and they are operated quite quickly, as are the shears 13, in order to avoid excessive chilling of the glass and undue retarding movement of the glass. The presser members 27 can be made of ordinary steel alloy, but if they are made of copper alloy or other metals which have great heat absorption and become heated quickly, the danger of chilling the glass by contact therewith will be reduced. The shear charge can be dropped into a shaping cup or directly into a mold.

The shear marks at the upper ends of the mold charges are not so troublesome, because I cut close to the orifice, in a thick hot portion of the mold charge, and such uppermost shear mark will automatically become incorporated in or be absorbed by the main body of glass in the mold charge.

The impact of the mold charge when it falls into a mold or into a shaping cup will also cause settling of the shear marked portion at the upper end of the charge into the body of the charge, and this would be true whether the walls of the cup or of the mold are either vertical or inclined. The inclined walls would exert a retarding force on the downward movement of the mold charge that would effect the sinking of the shear mark into the glass in somewhat the same manner as though the bottom of the charge initially engaged the bottom of the cup or the mold.

The retardent action to downward movement of the glass charge, whether in temporary receiving or shaping cups, or in the mold itself will, through settling of the thickened portion of the glass charge at the shear line A, cause swelling out of the contracted portion of the charge.

However, this latter feature will not be desirable in all cases, but will depend upon the shape of the mold, and consequently the shape of the article to be formed therein. In some cases, I will prefer to have the glass charge slightly contracted near its upper end, and in that instance, will not permit it to fall such distance that there will be material swelling out of the said reduced portion.

Referring now to Figs. 6 and 7, I show a shear mark C of the stub end type which is produced by V type shear blades, such as those shown in my said application. The charge may be sheared from a stream having the form shown in Fig. 6, or at a later period, after the glass has assumed somewhat the shape shown in Fig. 4.

In any event, at the time of shearing, or even before the glass reaches shearing position, a presser member 33 is swung upwardly to push the stub C into the mass of glass, as shown in Fig. 7. The presser 33 is mounted on one arm of a pivotally-supported bell crank 34, the other arm of the bell crank being connected to a link 35 which is connected to the piston of an operating cylinder 36, to which fluid pressure is admitted alternately, at opposite ends, in timed relation to the movement of the shears.

It will be understood, of course, that a mold table may be mounted beneath the feeding devices, and operated so as to present a mold in position to receive a mold charge upon each operation of the shear.

From the foregoing it will be seen that I not only provide a method whereby mold charges can be properly formed from a freely flowing stream of glass, but I provide an improved manner of eliminating the shear marks of mold charges formed by other feeding methods.

I claim as my invention:—

1. The method which comprises creating a downwardly flowing stream of molten glass, shearing said stream of glass to form successive mold charges, and simultaneously with the shearing thereof momentarily imparting pressure against shear-marked portions of the glass at the lower end of each charge in a direction to effect incorporation thereof into the body of the charge.

2. The method which comprises creating a downwardly flowing stream of molten glass, shearing said stream of glass to form successive mold charges, and simultaneously with the shearing thereof imparting pressure against shear-marked portions of the glass at the lower end of each charge in a direction to effect incorporation thereof into the body of the charge, the duration of pressure being substantially equal to the time required for severing of the glass.

3. Apparatus for dividing a downwardly flowing stream of glass into mold charges, comprising a shear device operable to cut the stream into sections, and presser members periodically movable toward the path of glass travel, from opposite sides thereof, to press irregularities adjacent to the lower ends of the charges into the bodies thereof, the said presser members being tiltably adjustable relative to the axis of the glass stream.

4. The method which comprises creating a downwardly flowing stream of molten glass, shearing said stream of glass to form successive mold charges, and simultaneously with the shearing thereof momentarily imparting pressure against shear-marked portions of the glass at the lower end of each charge in a direction toward and perpendicular to the adjacent surface of the mold charge.

EDWARD C. STEWART.